United States Patent [19]

Ahlen

[11] 4,037,432
[45] July 26, 1977

[54] RESILIENT DRIVING CONNECTION
[75] Inventor: Karl Gustav Ahlen, Stockholm, Sweden
[73] Assignee: S.R.M. Hydromekanik Aktiebolag, Stockholm-Vallingby, Sweden
[21] Appl. No.: 645,661
[22] Filed: Dec. 31, 1975
[51] Int. Cl.² .............................................. F16D 3/14
[52] U.S. Cl. ....................... 64/27 L; 64/11; 64/15 B; 64/27 B
[58] Field of Search ................. 64/27 L, 27 R, 15 R, 64/15 B, 14, 31

[56] References Cited
U.S. PATENT DOCUMENTS

| 1,963,188 | 6/1934 | Wood | 64/27 B |
| 1,977,368 | 10/1934 | Wood | 64/27 B |
| 2,207,362 | 7/1940 | Thorne | 64/27 L |
| 3,813,898 | 6/1974 | Hatch | 64/15 R |

FOREIGN PATENT DOCUMENTS

| 254,332 | 5/1927 | Italy | 64/27 L |

Primary Examiner—Samuel Scott
Assistant Examiner—Randall Heald
Attorney, Agent, or Firm—Larson, Taylor and Hinds

[57] ABSTRACT

A rotatable driving connection between driving and driven parts of the type having abutments in one part engaging radially extending slots in the other part, the abutments preferably being arranged in groups so that the resultant of the forces in one group is perpendicular to the resultant of the forces in the other group. A metallic strip between the opposed abutment and slot surfaces on the drive side is resiliently bent so that it is relatively stiff and engages both the abutment and slot surfaces and is such that it flattens to increase its stiffness upon an increase in the driving load. The metallic strip between the other side of the abutment and its slot surface, which is preferably an integral extension of the strip on the drive side of the abutment, is more resilient than the strip on the drive side of the abutment and is arranged to normally urge its respective abutment and slot surfaces apart causing the drive side abutment/slot surfaces to engage their respective metallic strip, and concurrently preventing backlash and maintaining contact between the later abutment/slot surfaces indirectly via the strip to the opposite side of the abutment and through the abutment to the last said abutment surface.

14 Claims, 7 Drawing Figures

RESILIENT DRIVING CONNECTION

BACKGROUND OF THE INVENTION

This invention relates to a driving connection for use between an internal combustion engine and for instance, a rotating casing of a torque converter and having a resilient intermediate part for transmitting drive.

The main operational requirements for such connections are that they should be capable of accepting a certain degree of misalignment and allow a certain degree of axial movement between the connected parts. At the same time the resilience should be such that the connected parts rotate at speeds below the critical speed the whole time, or in some cases, at speeds between the critical speeds ranges.

Many types of resilient driving connections are known and, in some of these, the resilience is varied for the transmission of different torques, allowing a critical speed to be exceeded or permitting operation in the critical speed ranges.

In general, known driving connections are expensive and fulfill the requirements to a greater or lesser extent in one respect or another. Such connections include star plates and different kinds of waved discs permitting very high critical speeds to be achieved. Soft rubber elements with a high damping capacity are also used between driving and driven parts in a drive-line fitted with a hydraulic drive.

In my copending application Ser. No. 504,235, filed Sep. 9, 1974, now U.S. Pat. No. 3,940,947, issued Mar. 2, 1976, which is a continuation-in-part of my application Ser. No. 367,376, filed June 6, 1974, now abandoned, there is disclosed and claimed an improved driving connection for rotatably drivingly connecting driving and driven parts. As disclosed and claimed therein, in an arrangement wherein axially extending abutments on one part engage slots in the other part, a first resilient means is interposed between the facing abutment/slot surfaces which engage in the normal drive direction, this first resilient means being relatively stiff and becoming stiffer as the driving load increases so as to maintain a resonant frequency which increases with an increased load to stay above the actual frequency of vibration imparted to the resilient means during normal operation thereof. Between the other side of the abutment and its opposed slot surface is provided a second resilient means having a stiffness less than that of the first resilient means but sufficient so as to resiliently urge the opposed abutment/slot surfaces apart causing the drive side abutment/slot surfaces to engage their respective metallic strip, and concurrently preventing backlash and maintaining contact between the latter abutment/slot surfaces via said second resilient means. Such means makes it possible to satisfy the conditions of force transfer during driving and braking as between the abutment and its slot while concurrently permitting movement of the abutments relative to their slots to adjust for misalignment between the driving and driven parts.

These and other goals were satisfied by the arrangement shown and described in my said previous copending application. However, the specific arrangement shown therein, namely one utilizing a coating or sleeve of rubber or other elastomeric material, while capable of carrying out the intended function, has given rise to certain disadvantages. Firstly, a material such as rubber or the like might be less reliable at extreme conditions. For example, it could possibly harden and/or become brittle at extreme temperature conditions. Also, a rubber sleeve or coating of this type tends to be relatively expensive. Thus, there exists a need for providing an arrangement which will permit achievement of the goals of the invention as set forth in my said previous copending application, without the disadvantages thereof.

SUMMARY OF THE INVENTION

It is the purpose of the present invention to provide a resilient driving connection having the advantages of the arrangement disclosed and claimed in my said copending application, but without the above noted disadvantages thereof.

This purpose of the present invention has been achieved by providing, in a driving connection of the type described, an arrangement wherein the resilient means interconnecting the opposed abutment/slot surfaces are formed entirely out of appropriately shaped metallic strips rather than rubber or other elastomeric materials.

Between the abutment/slot surface through which the driving force is normally transmitted, the strip of metal is made relatively stiff and is bent so that it contacts one of said opposed surfaces along a first axially extending portion and the other surface along a pair of axially extending portions. This bowed shape is progressively flattened out as the driving force urging the two said surfaces together increases. As this occurs, the metallic strip becomes stiffer, thereby increasing its resonant frequency, maintaining the same above the frequency to which the driving connection itself would be subjected under such operating conditions.

On the opposite side of the abutment, i.e., at the abutment/slot interface whereat driving force is not transmitted, except during braking, a metallic strip is arranged in such a way as to resiliently urge these surfaces apart, this strip having a greater resilience than the first mentioned metallic strip. As a result, all of the advantages described with respect to the resilient connection in the said copending application including correction for misalignment are achieved.

In accordance with a preferred arrangement, these two separately discussed metallic strips are actually formed as part of a single strip preferably connected to the abutment on the drive side thereof and bent into a U-shape about the abutment and then positioned to extend between the other opposed surfaces to accomplish the said function thereat.

In a preferred arrangement, the metallic strip in connected to the abutment on the drive side thereof contacting the abutment along at least two spaced apart axially extending lines and bowed outwardly therebetween to engage the slot at a single axially extending line. The arrangement is such that as the driving force increases, the bow flattens out, bringing closer together the said two spaced apart axially portions on the surface of the abutment and thereby increasing the stiffness of the metallic strip spring. In this preferred arrangement, the metallic strip continues around the abutment in a generally U-shape and on the opposite side of the abutment it is not attached to the abutment but it is urged outwardly against the side of the slot, urging that side of the slot and its facing side of the abutment away from each other. On this side the metallic strip spring is also desirably bowed outwardly so as to contact the slot surface at a single axially extending portion, although in this case in the normal rest position, this metallic strip does not contact this surface of the abutment opposite from the drive surface thereof.

Thus, it is a purpose of the present invention to provide in a resilient connection of the type for drivingly engaging a driving part and a driven part and including a plurality of abutments on one part extending into slots on the other part, an improved metallic resilient means for forming the resilient characteristics between said abutments and said slots.

It is still another object of this invention to provide, in a resilient connection of the type described, a resilient means including a metal strip spring arranged to provide desired resilient characteristics at both the driving opposed surfaces through which the driving force is normally transmitted and the other opposed surfaces.

It is still another object of this invention to provide, in a resilient connection of the type described, means for resiliently interconnecting abutments on one member with slots on the other member so as to provide the desired resilient characteristics while concurrently permitting movement of the abutments within the slots to correct for misalignment.

Other objects and the attendant advantages of the present invention will become apparent from the detailed description to follow, taken together with the accompanying drawings.

BRIEF DESCRIPTION OF THE DRAWINGS

There follows a detailed description of the preferred embodiment of the invention to be read together with the accompanying drawings in which.

DETAILED DESCRIPTION OF THE PREFERRED EMBODIMENTS

Figure 1:
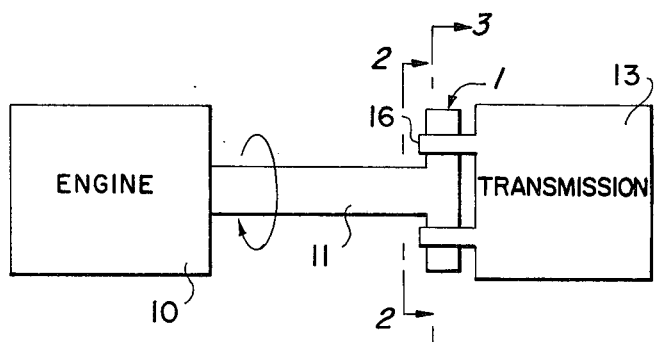
FIG. 1 is a schematic plan view illustrating the application of the present invention to a driving connection between an engine and a transmission.

Referring now to the drawings, like elements are represented by like numerals throughout the several views.

Figure 2:
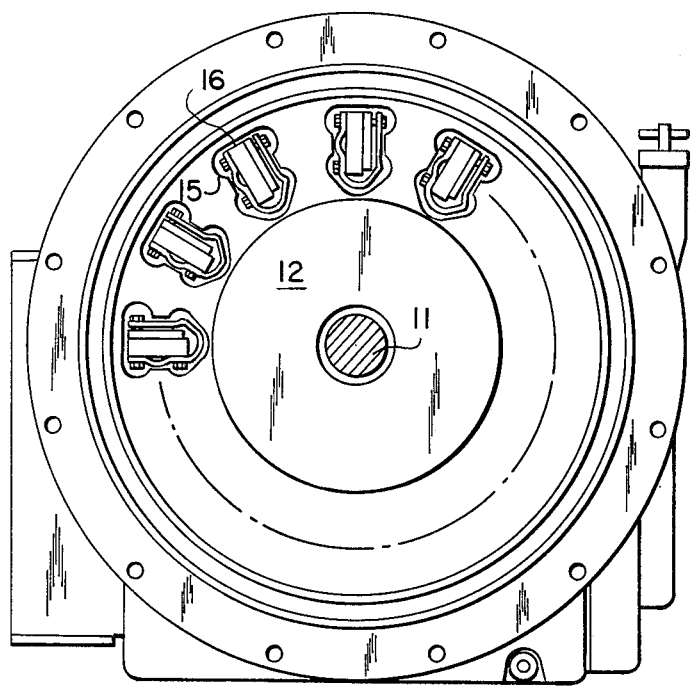
FIG. 2 is a sectional view taken along line 2—2 of FIG. 1.

FIG. 1 illustrates schematically the environment of the present invention. An output shaft 11 from an engine 10 such as a diesel engine transmits its torque via a flywheel 12 to a transmission 13 which may be a torque converter. Referring to FIG. 2, the flywheel 12 includes a plurality of slots 15 equiangularly spaced about the axis of the shaft 12, each of these cooperating with an abutment 16 projecting from and integral with and rotating part of the transmission 13 such as for example the rotating casing of the torque converter. As explained in the said earlier copending application, the plurality of abutment/slot connections are arranged to compensate for axial misalignment between the flywheel 12 and the transmission 13. This is accomplished by constructing the abutment/slot connections such that while radial movement between the abutments and the slots is permitted in radial movement between the abutments and the slots is permitted in radial directions because of the radial elongation of the slots currently positioned in that direction, such movement is only allowed without changing the center due to the effect of the slots and abutments in quadrature. That is, the abutment/slot connections can be thought of as being divided into pairs of groups, as described in the said copending application, such that the resilient force of each group of a pair is perpendicular to the resultant force of the other group of that pair. In addition, the abutments can undergo limited axial movement in their slots to further correct for misalignment and to take up axial displacements between the parts 11 and 12.

In the said copending application, a resilient means was provided between the abutment and the slot for permitting certain spring characteristics as described therein. In accordance with the present invention, as described in FIGS. 1 through 6, but especially FIG. 3, there is provided a resilient metallic strip, i.e., a strip of spring steel, which it has been found can most advantageously carry out this function.

Figure 4A:
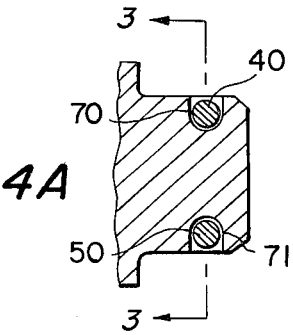
FIG. 4A is a cross-sectional view on a reduced scale of an abutment taken along line 4A—4A of FIG. 3.
Figure 3:
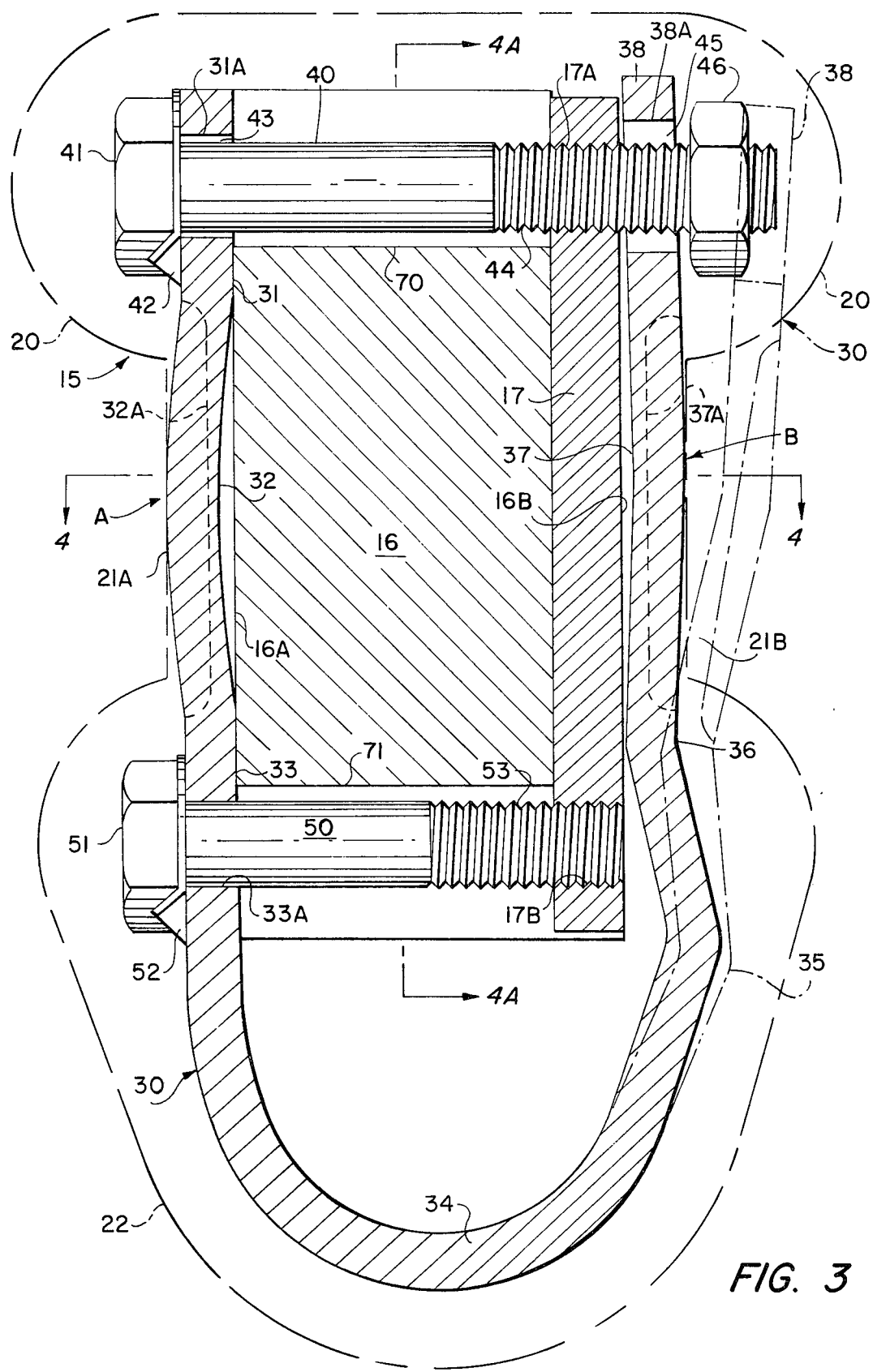
FIG. 3 is an enlarged view of one of the abutment/slot connections of FIG. 2 but taken in a sectional plane through the abutment and slot as represented by the plane 3—3 of FIG. 1.

Referring now to these figures, and in particular to FIG. 3, each slot 15 includes therein an abutment 16 which includes a mounting block 17 on one side thereof. Referring briefly to FIG. 4A, the abutments 16 may be cast in a simplified manner without bolt holes therethrough. Rather, as shown in FIG. 4A as well as FIG. 3, the abutment may be formed with upper and lower grooves extending thereinto. The block 17 can then be added to the abutment for the purpose of providing the threaded holes for receiving the bolts. Hence, it becomes necessary to precision machine only the block 17 and not the abutments 16. This of course simplifies the manufacture of the arrangement.

In FIG. 3, the flywheel would be moving from left to right so that the force would be transmitted from the flywheel 12 to the abutment member 16 on the left side of FIG. 3. The slot 15 includes an upper (radially outer) enlargement 20, a pair of parallel side walls 21A on the drive side and 21B on the other side, and an enlarged lower (radial inner) portion 22.

Figure 4:
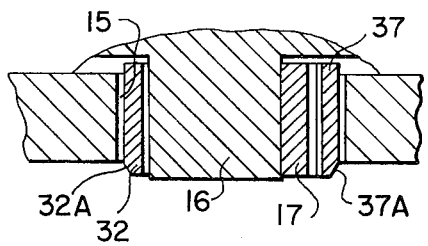
FIG. 4 is a sectional view but on a reduced scale, taken along line 4—4 of FIG. 3.
Figure 5:
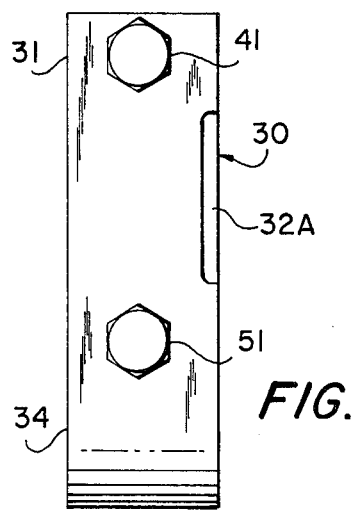
FIG. 5 is a side elevational view of the metallic spring element of FIG. 3, as viewed from the left-hand side of FIG. 3.
Figure 6:
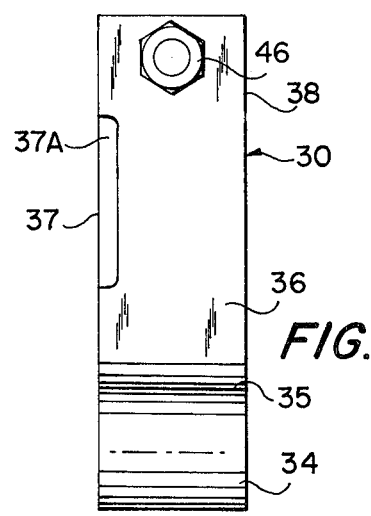
FIG. 6 is a side elevational view of the spring element of FIG. 3, taken from the right-hand side of FIG. 3.

In the preferred embodiment of the present invention which is illustrated in the figures, the resilient means comprises a spring in the form of a metallic strip 30. On the drive side, this strip 30 includes an upper end 31 which engages the drive surface 16A of the abutment 16 and is held firmly thereagainst by the head 41 of a bolt 40, this bolt being held in place by a locking device 42. To permit movement of the strip 30 in a manner to be described below, a slight clearance 43 is provided between the outer surface of the bolt 40 and the opening 31A provided in the upper end 31 for the passage of bolt 40 therethrough. Below the upper end 31, the strip bows outwardly at portion 32 and this outwardly bowed portion contacts the surface 21A. Theoretically, this contacting is accomplished along a theoretical axially extending line indicated generally as A. However, in practice, this line will really constitute an axially extending and also radially extending finite area. The strip 30 contacts the surface 16A again at a lower portion 33 which is firmly held to the surface 16A by the head 51 of a bolt 50, the latter passing through an opening 33A in the strip 30 and being held in place by a locking device 52. Beneath the abutment, the strip includes a curved loop 34, above and to the right of which the strip turns inwardly at 35 and then outwardly again at 36 to form a very slightly outwardly bowed portion 37, the upper portion 38 like the portion 36, then being located slightly closer to the surface 16B of the abutment than the center of the bowed out portion 37. The outwardly bowed portion 37 contacts the straight wall portion 21B of the slot at an axially extending area referred to generally as B. To facilitate movement of the abutments relative to the slots, the spring 30 should be polished at engaging surfaces A and B. Considering that the natural state of the metallic strip on the right-hand side of FIG. 3 is as shown in dotted lines therein, it will be understood that in the operative solid ine position, the strip is urged resiliently against surface 21B, thereby urging the abutment 16 to the left. The bolt 40 includes a threaded portion 44 passing through an enlarged opening 38A forming large clearance 45 therebetween. On the outer end of threaded portion 44 is a nut 46. At its right-hand end, the bolt 50 includes a threaded portion 53 which threadedly engages an opening 17B at the lower portion of mounting block 17. As shown in FIG. 4, and in dotted lines in FIG. 3, the spring 30 includes chamferred portions 32A and 37A to facilitate insertion of the abutments with the springs thereon into their respective slots.

The basic concept of the coupling, as described herein and as described in the said copending application is to maintain contact in the driving direction while permitting axial sliding without chattering, hammering, or the like and while incorporating stiffness characteristics high enough to allow "under critical" driving, i.e., a characteristic of a resonant frequency above the vibrations to which the abutment/slot connecting means would be subjected during normal operations. It must also be strong enough to permit the secondary side to follow the uneven movements of the primary drive side.

The present invention has found that this goal, which has been described in my copending application using rubber resilient means can now be accomplished using only spring metallic strips, and in a preferred arrangement with just a single spring strip. As described above, the strip is arranged between the opposed surfaces on the drive side so as to absorb some energy with a spring characteristic such that all driving will be under critical, i.e., below the resonant frequency of the metallic strip at that location, while causing the resonant frequency of the strip to increase for increased driving forces to be sure that it stays above the increasing level of the frequency of vibrations for increasing load. In the preferred arrangement, this is accomplished by providing the metallic spring strip such that the distance between the ends of the concavity of the bowed out portion of the metallic strip diminishes as the driving force increases and flattens out this strip. Further, with this arrangement if the driving force is distributed unevenly to the various abutments spaced apart around the axis, each individual spring can adjust itself to the forces being felt at that abutment/slot connection. On the side of the abutment opposite the drive side, i.e., the right-hand side in FIG. 3, the spring exerts a force which normally is strong enough to urge the abutment and slot surfaces into engagement with each other through the metallic strip on the drive side, the said portion of the strip on the non-drive side also being more resilient than the portion on the drive side, and designed to urge the abutment away from the non-drive side of the slot with a force sufficient to prevent backlash while concurrently small enough to permit the necessary axial sliding of the abutment and its metallic spring strip within the slot, i.e., along the surfaces 21A and 21B. The metallic strip therefore controls the distance between the non-drive abutment and slot surfaces 16B and 21B by maintaining these surfaces in contact with each other indirectly, i.e., from surface 21B, through loop 34 of spring 30 to the drive side, across surface 16A and through abutment 16 to surface 16B. When very rough stops and starts occur, contact might well be lost on the drive side. However, if this occurs, there is a certain energy stored in the bowed portion 37 of the spring which will then reestablish contact on the driving side. However, restoration of contact on the drive side should be accomplished without shock. Said shock is eliminated partly because of this outwardly bowed portion 37 which provides some resilience even after surfaces 16B and 21B have come together as a result of a large abnormal force or a braking force, and also the bent out portion 32 on the drive side will permit such abnormal forces to be smoothed out without shock.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. A resilient driving connection rotatably drivingly connecting a driving part and a driven part, comprising:

a plurality of drive units spaced about the axis of rotation of the parts, each unit comprising a drive member rigid with the driving part and a driven member rigid with the driven part, first opposed surfaces on the driving and driven members through which drive normally occurs, second opposed surfaces on the driving and driven members substantially free of driving forces during normal drive, but through which force is transmitted upon braking wherein the driven member drives the driving member, both pairs of opposed surfaces extending in planes which are radial or parallel to radial planes so that the driving and driven members can move radially relative to each other to correct for misalignment between the driving and driven parts, first resilient means interposed between the first opposed surfaces, said first resilient means having means for absorbing energy and becoming stiffer as the driving load increases, such that the resonant frequency thereof increases sufficiently rapidly with increased load that it stays above the actual frequency of vibration of the resilient means during normal operation thereof, and second resilient means interposed between the second opposed surfaces, said second resilient means having a stiffness less than that of the first resilient means so as to permit relative movement of both pairs of opposed surfaces for correcting for misalignment, but sufficiently stiff to keep the second opposed surfaces apart without backlash during substantially all normal driving conditions, said first resilient means comprising a metallic strip located between the first opposed surfaces and bent so as to normally resiliently engage both of said first opposed surfaces and to at least partially straighten out and become stiffer as the driving load increases, and said second resilient means comprising a metallic strip between the second opposed surfaces arranged to normally space the second opposed surfaces apart from each other while maintaining the first metallic strip in contact with the first opposed surfaces.

2. A resilient driving connection according to claim 1, said metallic strip of the first resilient means engaging one of the opposed surfaces along a single axially extending line and the other of the first opposed surfaces along two spaced apart axially extending portions located radially on opposite sides of the said single axially extending portion, wherein upon an increased load, the strip straightens out as the distance between the latter two axially extending lines decreases.

3. A resilient driving connection according to claim 1, wherein one of said driving and driven parts has abutments, the other having slots shaped to receive the abutments, the opposed surfaces comprising facing radially extending surfaces of the abutment and slot, said first and second resilient means comprising a single metallic strip extending about its respective abutment.

4. A resilient driving connection according to claim 3, said single metallic strip being a U-shaped strip fixed to its abutment on the side thereof at the first opposed surfaces and extending around a radial end of the abutment and extending between the second opposed surfaces resiliently free of rigid connection with the abutment and urging the second opposed surfaces apart, wherein said metallic strip maintains contact between the first opposed surfaces.

5. A resilient driving connection according to claim 3, said metallic strip normally touching the abutment at the first opposed surface along two axially extending portions and touching the opposed slot surface along one axially extending portion, the means connecting the metallic strip to the abutment allowing the metallic strip to straighten out as the driving load increases.

6. A resilient driving connection according to claim 5, the portion of the metallic strip at the second opposed surface is normally spaced from the abutment and bowed to engage the slot along a single axially extending portion, the side of the strip facing the abutment shaped to contact the abutment along a pair of axially extending portions when braking or the like causes reversal of the direction of driving force through the driving connection.

7. A resilient driving connection according to claim 3, wherein each slot is longer, in the radial direction, then its respective abutment, so that each abutment is free to undergo limited radial movement in its respective slot to adjust for misalignment between the driving and driven parts.

8. A resilient driving connection according to claim 7, each slot being longer in the radial direction than its respective abutment so that each abutment is free to undergo limited radial movement in its respective slot to adjust for axial misalignment between the driving and driven parts, and said abutments arranged in at least one pair of groups, wherein the resultant of the torque transmitting forces acting at the abutment/slot connections of the first group of the pair are perpendicular to the direction of the resultant of the other group of the pair.

9. A resilient driving connection according to claim 8, at least one group of the pair comprising two diametrically opposed abutment/slot connections.

10. A resilient driving connection according to claim 9, wherein both groups of each pair comprise two diametrically opposed abutment/slot connections.

11. A resilient driving connection according to claim 7, said driving and driven parts being a combustion engine and a hydraulic torque converter having a rotating casing and also a direct drive connection between the rotating casing and the output of the torque converter.

12. A resilient driving connection drivingly connecting a driving part and a driven part, comprising:
 a plurality of abutments projecting axially from one part into slots of the other part, which slots extend radially a greater distance than their respective abutments so that the abutments are movable radially within their respective slots to adjust for axial misalignment between the axes of the driving and driven parts,
 a resilient metallic strip located between each side of each abutment and its respective facing side of the slot,
 the metallic strip on the drive side of the abutment, which is the side through which the driving force is normally transmitted, being bent to normally contact both the slot and the abutment and to resiliently straighten out to increase its stiffness upon an increase of the driving load, so as to increase its resonant frequency to stay above the actual frequency of the vibrations for increasing loads thereat,
 the metallic strip on the other side of the abutment, which is the non-drive side normally free of driving force except during braking, having a greater resilience than that of the metallic strip on the drive side, and arranged to urge the abutment toward the drive side under normal operating conditions to urge the abutment and slot surfaces thereat into engagement with their metallic strip and to concurrently urge the non-drive facing surfaces of the abutment and slot away from each other.

13. A resilient driving connection according to claim 12, wherein the metallic strip between the opposed driving surfaces is a single metallic strip attached to the abutment on the drive side thereof and extending about the abutment to engage the slot on the other side of the abutment to urge that surface of the slot away from its opposed abutment surface.

14. A resilient driving connection according to claim 13, said single metallic strip being a U-shaped strip fixed to its abutment on the side thereof at the drive opposed surfaces and extending around a radial end of the abutment and extending between the non-drive opposed surfaces resiliently free of rigid connection with the abutment and, under normal operating conditions, urging the second opposed surfaces apart and maintaining said metallic strip in contact with the first opposed surfaces.

* * * * *